March 19, 1940.  T. T. ARDEN  2,193,851
OVEN THERMOMETER
Filed Feb. 25, 1939
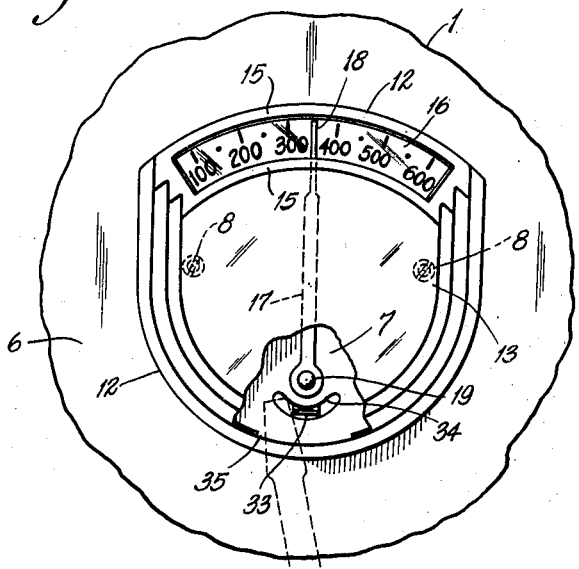
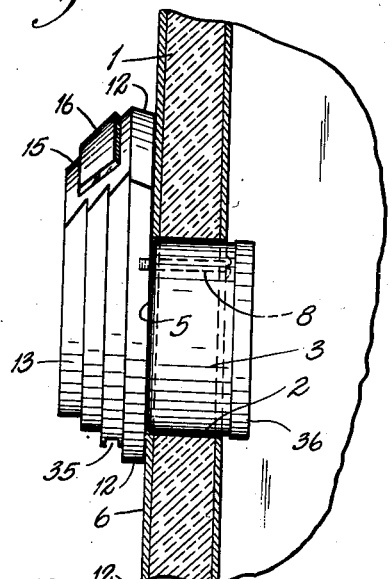
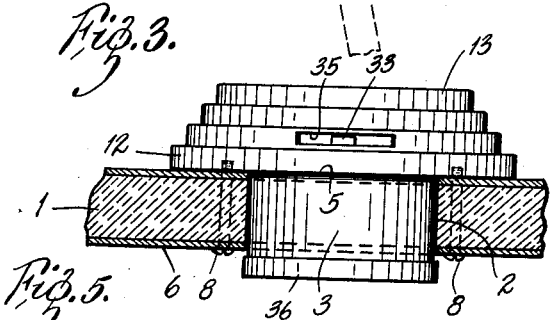
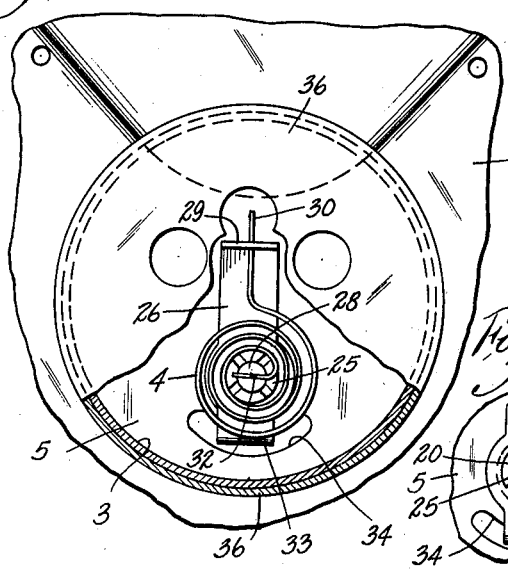
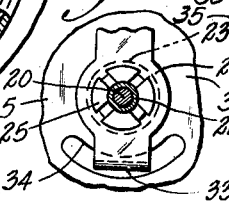
INVENTOR:
Thomas T. Arden,
by Carr Harr Gravely
HIS ATTORNEYS.

Patented Mar. 19, 1940

2,193,851

UNITED STATES PATENT OFFICE 2,193,851

OVEN THERMOMETER

Thomas T. Arden, Greensburg, Pa., assignor to American Thermometer Company, St. Louis, Mo., a corporation of Missouri Application February 25, 1939, Serial No. 258,542

2 Claims. (Cl. 73—367)

My invention relates to oven thermometers and has for its principal object a thermometer having simple, reliable and efficient adjustment or calibration means and so constructed that the oven temperature can be read easily, quickly and accurately.

The invention consists principally in an oven thermometer provided with an adjusting means whereby it can be adjusted from the outside of the oven door without dismantling the thermometer, but which adjusting means is concealed from view. It further consists in providing the dial plate with an inclined dial portion whereby the temperature can be easily read without stooping. The invention further consists in the oven thermometer and in the parts and combinations and arrangements of parts hereinafter described and claimed.

In the accompanying drawing:

Fig. 1 is a front elevation of an oven thermometer embodying my invention,

Fig. 2 is a side elevation, a portion of the oven door being shown in section,

Fig. 3 is a bottom view, a portion of the oven door being shown in section,

Fig. 4 is a vertical sectional view on an enlarged scale,

Fig. 5 is a partial rear elevation as indicated by the line 5—5 in Fig. 4; and

Fig. 6 is a fragmentary sectional view on the line 6—6 in Fig. 4.

An oven door 1 is provided with an opening 2 in which is mounted a cup 3 which contains a coil 4 of heat responsive metal and other mechanism, as hereinafter described. The flat bottom 5 of said cup 3 is substantially flush with the front face 6 of the oven door and a dial plate 7 is secured to said cup bottom 5 and rests against the front face 6 of the oven door. Said dial plate is secured to the door 1 by means of screws 8 extending through said door into holes tapped into said dial plate. Said dial plate 7 may be secured to the cup in any suitable way as by welding, and is shown as having a positioning boss 9 which cooperates with an opening 10 in the bottom of the cup. The dial plate 7 has a peripheral flange 11 over which is engaged the peripheral flange 12 of an outer case 13.

The dial plate 7 is provided in its upper portion with an inclined dial or scale portion 14 and the outer case 13 has a correspondingly inclined bezel 15 in which is mounted a curved and inclined window 16 through which the readings may be taken. A pointer 17 has an inclined indicating portion 18 disposed over the scale and is of angular shape to follow the contour of the dial plate 7. The pointer 17 is secured, as by riveting 19, to the end of a shaft 20 which is concentric with the scale 14 on the dial plate 7 and which extends through a sleeve 21 that is mounted in alining openings 22 in the dial plate 7 and cup bottom 5. Said sleeve 21 is rotatable in the cup bottom 5 and dial plate 7 and is secured against movement inwardly of the oven by means of a washer 23 secured on its outer end as by riveting or swaging the end portion 24 of said sleeve 21. The sleeve 21 is provided with a flange 25 on the inside of the cup that prevents movement outwardly of the oven, the body portion of an adjusting lever 26 (hereinafter more fully described) being mounted on said sleeve 21 between the flange 25 and the cup bottom 5. Said sleeve 21 abuts against a shoulder 27 formed by the enlarged end portion 28 of the pointer shaft 20.

The adjusting lever body 26 is secured to said sleeve 21 and rotates over the cup bottom 5. Said adjusting lever 26 has an arm 29 extending at right angles from its body into the cup 3 and the thermometer coil 4 has its upper end 30 disposed in a slot 31 in said adjusting arm 29, the other or inner end 32 of said coil 4 being rigidly secured to the end of said pointer shaft 20. Said adjusting lever 26 has an outer or actuating arm 33 extending at right angles through alining arcuate slots 34 in the cup bottom 5 and the dial plate 7, such arm extending far enough to overlie an opening 35 in the bottom of the outer case or bezel member 13. The back of the cup may be provided with a cover 36.

In the normal operation of the thermometer, the expansion and contraction of the thermometer coil 4 due to heat changes will obviously cause rotation of the pointer shaft 20, as the upper or outer end of said coil is anchored in the arm 29 of the adjusting lever. Adjustment or calibration of the thermometer is easily accomplished by inserting the end of a screwdriver or other tool in the case opening and swinging the outer arm 33 of the adjusting lever, which will obviously cause the adjusting lever and sleeve to rock and will change the position of the upper end of the thermometer coil, whereupon the inner end of the coil will cause the pointer shaft to rotate, thus changing the position of the pointer on the scale.

The above described thermometer construction is easily applied to an oven door and the inclined scale makes it quite easy to take accurate temperature readings without stooping. Adjustment or calibration of the thermometer is easily accomplished, whereas former thermometers have required dismantling of the thermometer from the oven door.

Obviously numerous changes may be made without departing from the invention and I do not wish to be limited to the precise construction shown.

What I claim is:

1. An oven thermometer comprising a dial plate, a sleeve rotatably mounted in said dial plate but held against endwise movement therein, a pointer shaft rotatably mounted in said sleeve but held against endwise movement therein, a pointer fixed on said shaft, an adjusting lever mounted to turn with said sleeve and having an upper and a lower opposed projecting arm, a thermoresponsive element having one end disposed in a slot provided therefor in said upper arm and its other end rigidly secured to said pointer shaft, said lower arm extending through a slot provided therefor in said dial plate, and a case for said dial plate having a slot providing access to said lower arm for adjusting the position of said pointer.

2. An oven thermometer comprising a dial plate, a sleeve rotatably mounted in said dial plate but held against endwise movement therein, a pointer shaft rotatably mounted in said sleeve but held against endwise movement therein, a pointer fixed on said shaft, an adjusting lever mounted to turn with said sleeve and having an upper and a lower opposed projecting arm, a coil of thermoresponsive metal having its outer end disposed in a slot provided therefor in said upper arm and its inner end rigidly secured to said pointer shaft, said lower arm extending through an arcuate slot provided therefor in said dial plate, and a case for said dial plate having a slot in its bottom providing access to said lower arm for adjusting the position of said pointer.

THOMAS T. ARDEN.